US 7,421,443 B2

(12) United States Patent
Rajan et al.

(10) Patent No.: US 7,421,443 B2
(45) Date of Patent: Sep. 2, 2008

(54) FILESTREAM DATA STORAGE ATTRIBUTE

(75) Inventors: Rajeev B. Rajan, Kirkland, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/353,730

(22) Filed: Jan. 29, 2003

(65) Prior Publication Data
US 2004/0148308 A1   Jul. 29, 2004

(51) Int. Cl.
*G06F 17/30* (2006.01)
(52) U.S. Cl. ...................................................... 707/102
(58) Field of Classification Search ............... 707/1–10, 707/100–104.1, 200–206, 126; 709/227, 709/231, 236; 717/108
See application file for complete search history.

(56) References Cited

U.S. PATENT DOCUMENTS

| | | | | |
|---|---|---|---|---|
| 6,442,748 | B1 * | 8/2002 | Bowman-Amuah | 717/108 |
| 6,477,580 | B1 * | 11/2002 | Bowman-Amuah | 709/231 |
| 6,546,394 | B1 * | 4/2003 | Chong et al. | 707/100 |
| 6,549,949 | B1 * | 4/2003 | Bowman-Amuah | 709/236 |
| 6,550,057 | B1 * | 4/2003 | Bowman-Amuah | 717/126 |
| 6,606,660 | B1 * | 8/2003 | Bowman-Amuah | 709/227 |
| 2006/0112095 | A1 * | 5/2006 | Xie et al. | 707/5 |
| 2006/0253502 | A1 * | 11/2006 | Raman et al. | 707/202 |

OTHER PUBLICATIONS

Adam, Nabil R., et al., "SI in Digital Libraries, Scaling on an international level requires integrating independently evolved sytems," Communications of the ACM, vol. 43, No. 6, Jun. 2000, pp. 64-72.

Hull, Richard, "Managing Semantic Heterogeneity in Databases: A Theoretical Perspective," PODS '97, Tucson Arizona, 1997, pp. 51-61.

Klavans, Judith, "Data Bases in Digital Libraries: Where Computer Science and Information Management Meet," PODS 98, Seattle, Washington, 1998, pp. 224-226.

Schauble, Peter, "Spider: A Multiuser Information Retrieval System for Semistructured and Dynamic Data," ACM-SIGIR '93, Pittsburgh, Pennsylvania, Jun. 1993, pp. 318-327.

Shapiro, Michael, et al., "Managing Databases with Binary Large Objects," IEEE, 1999, pp. 185-193.

Suciu, Dan, "Distributed Query Evaluation on Semistructured Data," ACM Transactions on Database Systems, vol. 27, No. 1, Mar. 2002, pp. 1-62.

Wang, Ke, et al., "Discovering Typical Structures of Documents: A Road Map Approach," SIGIR '98, Melbourne, Australia, 1998, pp. 146-154.

Zdonik, Stanley B., "Incremental Database Systems: Databases from the Ground Up," SIGMOD May 1993, Washington, DC, 1993, pp. 408-412.

* cited by examiner

*Primary Examiner*—Diane Mizrahi
(74) *Attorney, Agent, or Firm*—Woodcock Washburn LLP (57) ABSTRACT

Large, unstructured objects can be manipulated within a relational database management system (RDBMS). A "filestream" data storage attribute is provided that can be used to tag a column in a relational table. The filestream attribute identifies the data for that column will be stored as a file in the file system in the operating system. The RDBMS manages the creation and deletion of the file in the file system. There is a 1:1 reference between the file in the file system and a cell (intersection of row and column). The data in the filestream column can be manipulated the same way as the data in other columns using a programming language, such as SQL or MICROSOFT®'s T-SQL.

23 Claims, 5 Drawing Sheets

FILESTREAM DATA STORAGE ATTRIBUTE

FIELD OF THE INVENTION

This invention relates in general to the field of database management. More particularly, this invention relates to the storage and searching of large unstructured data types in databases.

BACKGROUND OF THE INVENTION

Existing commercial relational database management systems (RDBMS) are geared toward business applications that manipulate well-structured tabular data. However, the rapid growth of the Internet coupled with increased storage capacities has resulted in a proliferation of large, unstructured data objects (LOB) such as documents, images and video streams. A growing number of business applications combine the manipulation of structured tabular data with these LOBs. However, conventional databases have weak support for large, unstructured data objects; therefore, this type of data cannot be easily searched, manipulated, and accessed. This results in problems, such as data consistency and administration problems. Conventionally, large objects are stored as small pieces that must be retrieved and then assembled. Accordingly, there is a need for the ability to store a large object as one contiguous file that can be searched, manipulated, and accessed.

SUMMARY OF THE INVENTION

The present invention provides improved methods and systems for manipulating large, unstructured objects within a RDBMS. A "filestream" data storage attribute is provided that can be used to tag a column in a relational table. The filestream attribute indicates that the data for that column will be stored as a file in the file system in the operating system (OS). The RDBMS manages the creation and deletion of the file in the file system. There is a 1:1 reference between the file in the file system and a cell (intersection of row and column). The data in the filestream column can be manipulated the same way as the data in other columns using a programming language, such as SQL or MICROSOFT®'s T-SQL.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention provides large object access in databases via query languages such as SQL and MICROSOFT®'s T-SQL. A type "filestream" is described and is exposed to a programming model in the form of a construct in order to implement efficient access to these values in the database.

Exemplary Computing Environment

Figure 1:
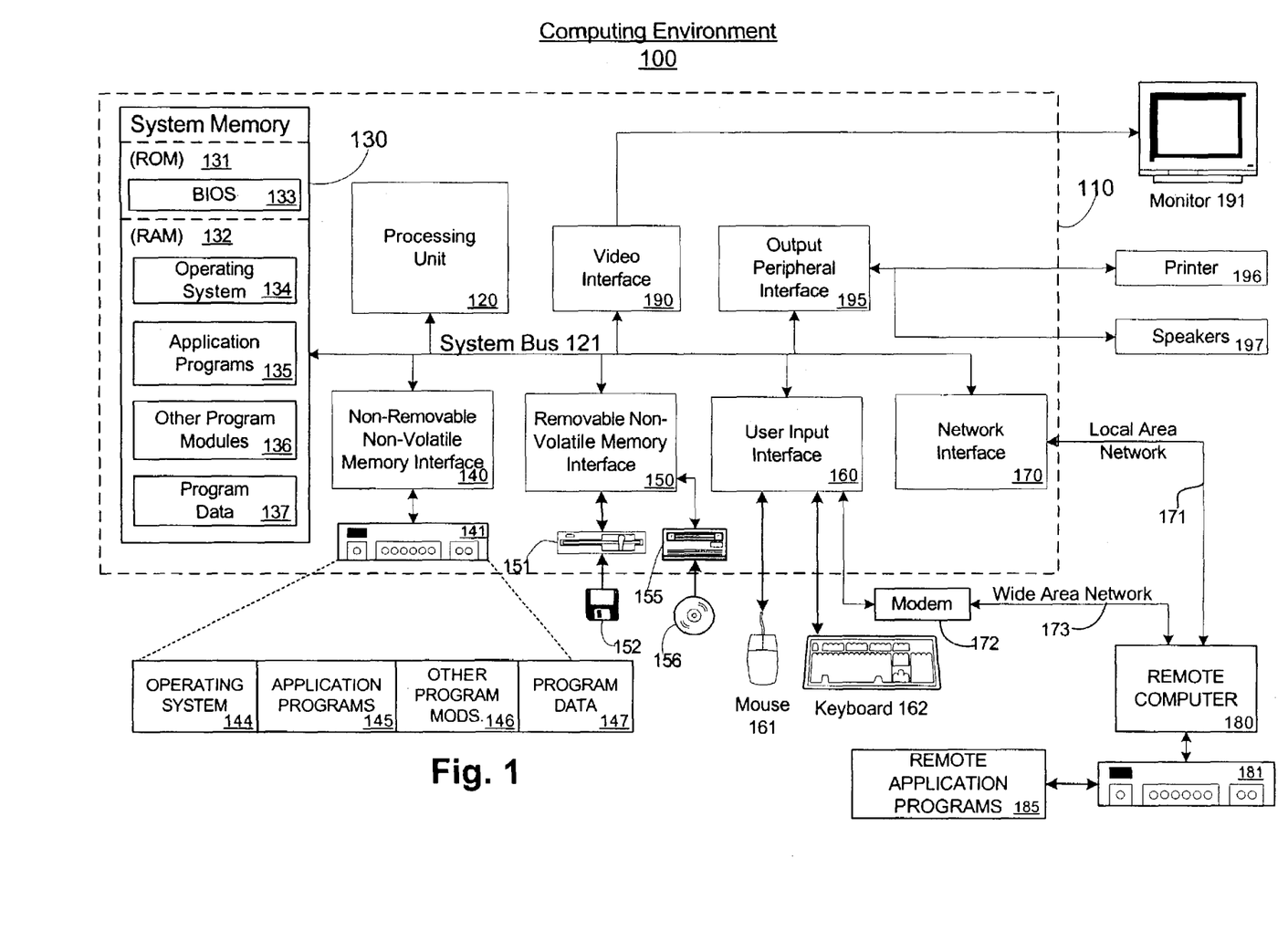
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or information delivery media. By way of example, and not limitation, communication media includes wired media such as a wired network or direct-wired connection, and wireless media such as acoustic, RF, infrared and other wireless media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office.NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of NET's languages and services, and in other distributed computing frameworks as well.

Exemplary Embodiments

A filestream data storage attribute is provided for storing and manipulating large, unstructured objects (LOB) within a relational database management system (RDBMS). The filestream attribute can be used with a database, such as a MICROSOFT® SQL Server. The filestream attribute alerts the RDBMS to store the attributed large object in the file system as a complete, contiguous file (not part of a basic database file in pieces) and manages the synchronization desired for data consistency and administration. The database management system provides a consistent programming and administration model for large objects to all business applications. This frees the application from creating ad-hoc infrastructure for manipulation of large objects. An example of such ad-hoc infrastructure would be when an application itself stores a LOB as a file in the file system and then stores a reference to that LOB (as an URL or pathname, for example) in a column of a table in a database. A problem with such an approach is that either there will be inconsistency in the system (when, for example, the system crashes) or the application will have to go to great lengths to ensure consistency.

Preferably, a column in a relational table is tagged with the filestream data storage attribute. The data for a column is stored as a file in the file system in the operating system (OS). The RDBMS manages the creation and deletion of the file in the file system. There is a 1:1 correspondence between the file in the file system and a cell (intersection of row and column). The data in the "filestream column" can be manipulated the same way as the data in other columns using a programming language, such as MICROSOFT®'s T-SQL. In this way, the view of the database to the user does not change; the user can use the file via a new statement in the existing database language.

The semantics of the filestream data type are preferably substantially identical to SQL blob types such as the variable length binary data type (i.e., varbinary). Applications can access the filestream value only through the database. The database owns the lifetime of the value, manipulation of the value, administration with respect to backup and restore, and any other consistency requirements. One can obtain/generate a pathname that can be used in a request to manipulate this value in the programming model.

Preferably, the data is stored as a stream in a file system external to the database. Typically, in SQL for example, column values are stored inline with the row. For filestream-type values, the information stored inline with the row is not the value but an opaque blob (referred to herein as the "FILESTREAMMONIKER") that preferably comprises the information to identify a stream in a file system volume.

A unique volume identifier (e.g., a volume GUID) and a unique stream identifier (e.g., a stream GUID) can be used to uniquely identify the stream in the file system and desirably store them in the FILESTREAMMONIKER. This ensures that the database encoding does not depend upon the environmental parameters associated with a volume when it is mounted, e.g., the drive letter associated with it or the server hosting it.

In the case of applications that use the database as the primary repository, it is desirable to store the data outside the database in file systems as opposed to large blobs in the database because of: (1) the convenience in using existing applications to manipulate large blob values in the database, e.g., MICROSOFT®'s Windows Media Player for playing back media files; and (2) the performance/price advantage in building very large databases.

Pathnames for blob values stored in a database enable the application designer to use existing tools and applications to manipulate the blob values. Manipulation of the blobs is offloaded from the SQL application server, for example, onto secondary blob storage servers called filestream servers. This enables database architectures to be built as a federation of SQL servers and storage servers, leveraging the price/performance of advances in network attached storage.

When the filestream value is stored external to the database, it is possible to manipulate the value in two ways: (1) in-band using the SQL Language Processing and Execution Engine (LPE), Query Processor (QP) and the Storage Engine (SE), and (2) out-of-band using other APIs (application programming interfaces).

Figure 2:
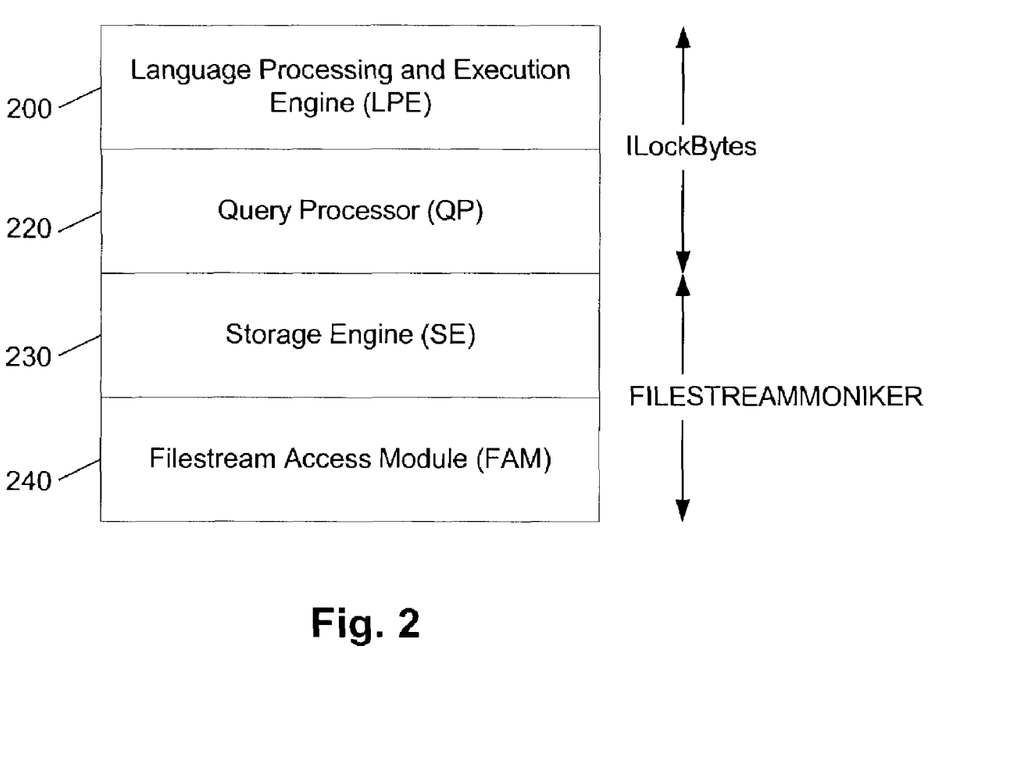
FIG. 2 is a high level diagram of exemplary database components that can be used in accordance with the present invention.

FIG. 2 is a high level diagram of exemplary database components that can be used with the present invention. The LPE 200 is provided along with the QP 220. The SE 230 and a filestream access module (FAM) 240 are also provided. The LOB data types are manipulated using an interface (e.g., in SQL, the ILockBytes interface) down the LPE/QP/SE stack. The FAM 240 provides the interfaces on filestream values. In addition to synthesizing the ILockBytes interfaces for the filestream values, the FAM 240 manages the association of file system volumes with a database and the creation/deletion of filestream values.

Because the in-row data that is stored for a filestream value is a FILESTREAMMONIKER, the SE 230 and the FAM 240 use it along with a database unique identifier to identify filestream values and synthesize the appropriate interfaces. However, the introduction of filestream type preferably does not change the interface between the Storage Engine 230 and other components such as the Query Processor 220.

The in-band mechanism for manipulating the values can be further classified into retrieve-by-value and retrieve-by-reference techniques. In the retrieve-by-value technique, the actual data is sent back to the client, while in the retrieve-by-reference technique, a reference to the filestream values is sent back to the client. A pathname (described further below) is used as the mechanism for sending such references to the client.

The retrieve-by-reference mechanism is implemented for the clients to take full advantage of the filestream type. This permits the clients to lazily fetch the value of the column when desired. It is desirable, in terms of performance, to not evaluate the value for each column at the time of the initial query. Instead, a more demand-based approach is provided in which value evaluation is done on demand.

In SQL, a column can participate in an index and a row can have CHECK constraints and triggers associated with it. These CHECK constraints and triggers impose constraints on how a data value associated with a given column is updated in SQL. The current SQL implementation handles these in-band updates. In order to enable and exploit an out-of-band mechanism for updating filestream values, it is desirable to ensure that these constraints are honored.

The column containing the filestream value can be a part of a database index or trigger. In such cases, the out-of-band mechanism for updating the values desirably satisfies the following conditions: (1) establishes a suitable point where all data changes are completed; (2) provides pre- and post-images of the data for the column, when the changes are committed to the database; (3) has a cache coherency protocol between the database server and the filestream server (i.e., if a filestream column is added to an index or a new constraint or trigger is defined on the row, the database desirably communicates this information to the filestream server so it is aware of the extra consistency requirements); and (4) if accessing the column data requires obtaining row-level locks, the code responsible for out-of-band changes will acquire row-level locks before making the changes.

Preferably, the SQL Server administrator will be provided with DDL (Data Definition Language) statements to control the placement of filestream data on a file system volume. Further, the data in the file system is backed up and restored the same way as regular database data. Database recovery will synchronize with the recovery of data in the file system to guarantee data consistency.

In order to address the scalability needs of a number of scenarios, the filestream data can be scaled-out on a number of nodes separate from the node on which SQL Server is running. This offloads valuable processor cycles from the SQL Server machine to other machines for purposes of streaming out the filestream content.

A pathname refers to a file located on the database server machine. Typically, the pathnames are obtained by the client machine from the database server to manipulate values that reside on the filestream server. These various machines are described further below with respect to FIG. 4. It is desirable to make the access to the filestream values as efficient as possible. The pathname abstraction incorporates the ability to name a cell. In order to uniquely identify a cell name, the following are preferably specified: the database, the table in the database, the row in the table, and the column in a given row. Further disambiguation can be incorporated by including the name of the machine as another element of the tuple specifying the pathname. The name of the machine can be any one of the forms which can be currently used to identify the SQL Server machine in the client libraries (e.g., IP address, virtual IP address, machine name in domain, globally unique name of the service, etc).

A file system pathname can be generated for a cell containing the filestream data, which can be used to manipulate the cell's contents using the Win32 API, for example. Pathnames can be passed in/out of the database; i.e., a pathname can be constructed and passed in as the "value" for a cell of type filestream. This may be used in cases where the application creates a file out-of-band and wants this to be preserved as the "value" for a cell. Alternately, a pathname can be obtained to a newly created row. In this case, the Storage Engine 230 will create a new file on one of many volumes associated with the database (e.g., using a round-robin scheme for load-balancing).

The pathname abstraction incorporates the notion of fetch-by-reference into T-SQL. Instead of retrieving the values associated with a column for any given row that satisfies a query, it may be desirable to retrieve the pathnames associated for a given row/column pair in any given query. These pathnames can be subsequently used to retrieve the associated values.

Exemplary pathnames are typically of the form:
\\SqlServerName\DatabaseName\FilegroupName\ContainerName\TableName\ColumnName\ROWGUID There are certain scenarios where the stored filestreams are largely read-only (e.g., an archive of satellite images). In this case, there is mostly read-only data stored as streams, and the column does not participate in an index. In such cases, the filestream column and the pathname extensions can be used for enhanced performance (e.g., by scale-out) without building additional code into the filestream server that handles out-of-band update issues.

Consider an application that stores tables for weather maps. In such cases, users desirably store pathnames to the row containing the weather map of their choice, e.g., a query results in a pathname to a column for the weather map of the city row in a table. As time varies, the actual value for this column also varies. The end-user desirably does not change the value. In such cases, the end-user application will store pathnames that only contain the unique volume identifier of the file system volume that stores the filestream value. The filestream server will work in conjunction with the database server to access the associated value at any point in time.

Content-editing applications edit streams on the filestream server with transactional semantics. For example, a photo-album application may store the photo images as filestreams. The application would like to annotate many rows at a time with all or nothing update semantics. Desirably, the filestream server would have transactional capabilities to implement this. A typical application would start a transaction against the database server, issue a query for multiple rows and get back a result set which contains pathnames for the filestream (e.g., photo image) column. The application then provides the pathnames to an application (e.g., a photo editor). The application opens these files in the context of the same transaction. The client redirector will communicate with the appropriate server, thereby passing the transaction context through. The server will open these streams after negotiation (e.g., row-level locking with the database). After the application has made the desired updates and commits, code on the server will tunnel the update through to the database with pre/post images. This ensures the transactional semantics for the application (i.e., all the photos are updated or none).

If the LOB column (e.g., filestream) participates in indexes, triggers or constraints, it is desirable that all data updates go through the database so the indexes, triggers or constraints can be applied. In the case where manipulations on the filestream are by value, data changes are applied through the LPE/QP/SE stack. In accessing by value, the application does not have a FILESTREAMMONIKER and therefore is not changing data out-of-band of the database. A solution would be to provide the FILESTREAMMONIKER with the understanding that the entity that converts this into an open on a stream will use the pathname to obtain meta-information on a column. Specifically, the filestream server will use the pathname to go back to the row in the database and find out if the column participates in an index, constraint, etc. If this is the case, the server will ensure that at commit time, pre/post images are sent via UPDATEs down the SQL stack. The solution is desirable because it means that the Storage Engine 230 can provide pathnames with embedded FILESTREAMMONIKERs and not have to make a choice based on whether or not a column participates in an index, constraint, trigger, etc. The burden of finding this out and acting accordingly is shifted to the entity that actually does the physical stream open, i.e., the server.

Figure 3:
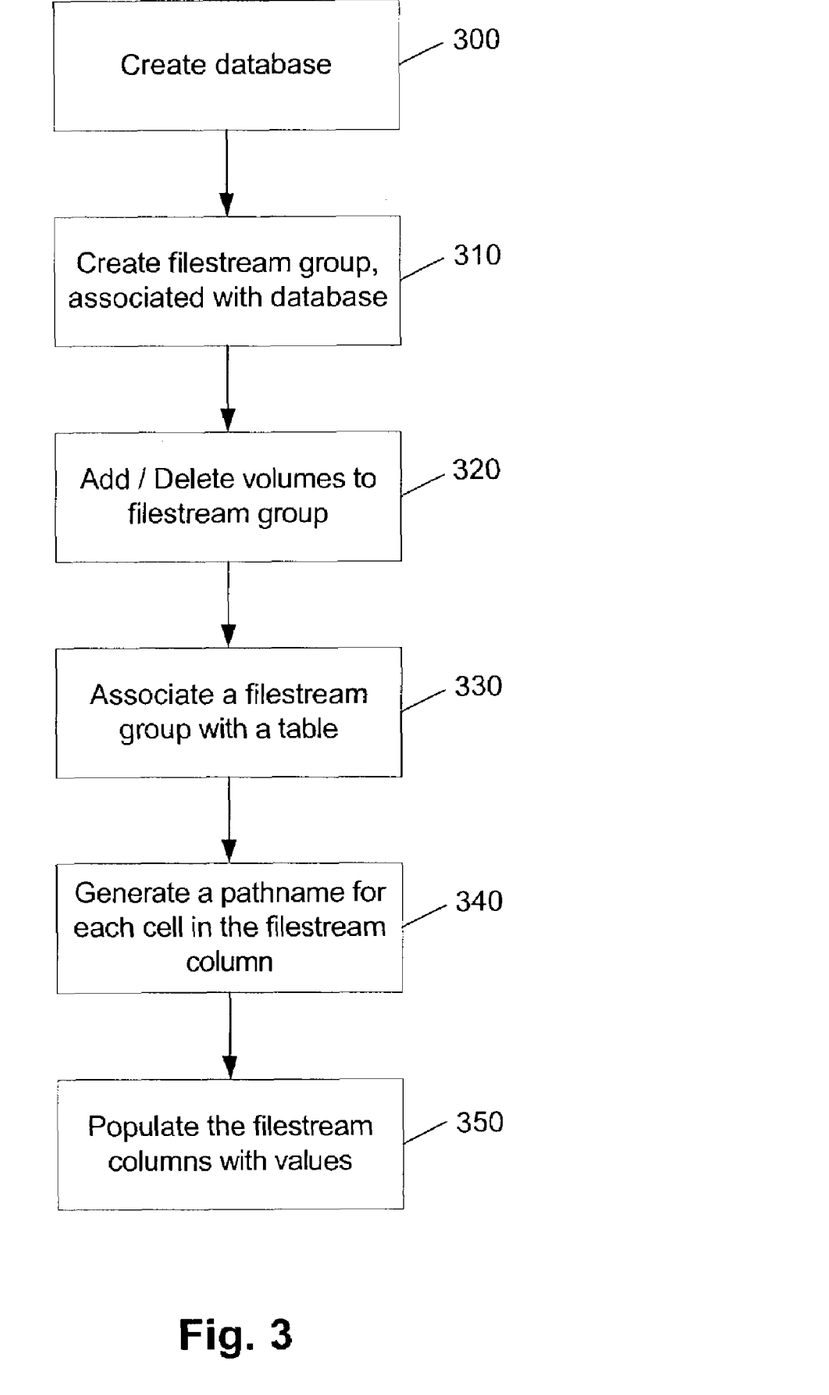
FIG. 3 is a flowchart of an exemplary method of creating a database with filestreams in accordance with the present invention.

A programming model for creating a database with a filestream column is now described. MICROSOFT®'s SQL Server 2000 has rich T-SQL commands for configuring the system files for a database. These commands give the database administrator a wide range of configuration choices, thereby enabling the administrator to take advantage of different configurations to get the desired performance for their database application. FIG. 3 is a flowchart of an exemplary method of creating a database with filestreams in accordance with the present invention.

Initially, at step 300, a database is created. A command to create a database is: CREATE DATABASE newdb. In the current programming model, this command can be augmented to create customized configuration (or added later as part of ALTER DATABASE). For example, SQL Server 2000 has the notion of FILEGROUPs. As part of CREATE DATABASE or ALTER DATABASE, the database administrator can add/delete one or more FILEGROUPs. Each FILEGROUP consists of a set of OS files. When creating a TABLE, the administrator can specify the FILEGROUP for storing the data.

Filestream groups are created at step 310. Database configurations (FILESTREAMGROUPS) are provided in which the data is stored outside the database. A FILESTREAMGROUP is a set of volumes that contain the filestream data associated with a database. By default, there exists a primary FILESTREAMGROUP that has only one volume. This can be modified using ALTER DATABASE to add/delete volumes to a FILESTREAMGROUP, at step 320. There are no restrictions on the number of FILESTREAMGROUPS associated with a database as well as the number of volumes associated with a FILESTREAMGROUP.

After a database has been associated with a FILESTREAMGROUP, each FILESTREAMGROUP is associated with a TABLE, at step 330. In SQL Server 2000, the TEXTIMAGE_ON modifier to CREATE TABLE allows the database administrator to specify the FILEGROUP in which the text, ntext and image column data associated with a table are stored. A FILESTREAM_ON modifier is implemented and added to the CREATE TABLE DDL. If not specified, the default volume is preferably the volume associated with the table's FILEGROUP. This provides the basis for defining the storage environment of a filestream column with any TABLE. The next step is the incorporation of a column of type filestream in a table definition to create a pathname, at step 340. One option for pathnames generated for the values is:

\{DatabaseName\}\\{TableName\}\\{ColumnName\}\
\{FILESTREAM GUIDs . . . \}

This organization has the property that all the values associated with a given column are grouped together. Therefore, operations like dropping a column in the database table translate to deleting the directory corresponding to the column. This provides a mechanism for deleting the row when a row has at most one filestream column type. Note that each such pathname corresponds to a cell in a table. It is noted that the filestream identifier (i.e., StreamGUID) picked for each filestream cell is unique.

At step 350, the filestream columns are populated. There are several techniques to populate the filestream column in a TABLE, several examples of which follow.

Insert a null value—The FILESTREAM type will support NULLABILITY, i.e., A row can be created with a NULL value for the filestream column. This is useful for applications with sparse filestream content because unnecessary zero length files do not have to be created for column values that do not currently exist. An example is: INSERT customer VALUES ('john', '425-882-8080', '1234', NULL) In this case, the pathname to return for NULL columns should be provided.

Insert an empty value—A row can be created with an empty value for the filestream column. This means a file will be created that is zero length. An example is: INSERT customer VALUES ('john', '425-882-8080', '1234', '').

Insert with data inline—A row can be created with data for the filestream column inline as part of the query language statement. Typically, the length of data stored in this column will be large. An example is: INSERT customer VALUES ('john', '425-882-8080', '1234', '<contents>').

Insert with data copied from a file—A row can be created with data for the filestream column copied from a pre-existing file. Instead of inserting the value in parentheses, a filename is indicated with the CopyFromFile( ) keyword. Data is copied in to the filestream column from this file. An example is:

```
DECLARE @pathname char(260)
@pathname = '<path to a file>'
INSERT customer VALUES ('john', '425-882-8080', '1234',
  CopyFromFile
(@pathname))
```

Preferably, when a row containing a filestream value is deleted, the file backing the filestream column residing outside the database is also deleted.

The filestream values can be subsequently retrieved from a table by value or by reference. An end user application issues a query for one or more pathnames. The application converts the pathname to a handle that may or may not entail a trip to the row in the database depending on whether the data has changed with time or not.

Certain applications may have the requirement that the row needs to be locked before the filestream column can be accessed. In such cases, it is desirable that (1) the server is able to use a pathname to get to the table in the database and find some property that indicates that row-level locks need to be acquired; and (2) the server acquires a row-level lock and releases it at appropriate times.

The infrastructure support for the filestream type will be implemented in the SE Access Methods module, provided within the Storage Engine 230. This is the place where a fork is made between varbinary and filestream data types. Based on the data type, the SE Access Methods code will call the FAM 240 which create, delete, read, and write file system streams. The FAM 240 will provide support for all the ILockBytes interface methods needed to support this data type.

Creating a row with a column of type filestream involves creating data outside the database, i.e., a file. Hence, consistency between the database and the data in the file system is very important. There are two kinds of consistency issues to consider: link level consistency and value level consistency. Link level consistency comes into play during creation/deletion of a row. Creating a new row with a filestream column involves creating a new file. Similarly, deleting the row involves deleting the file. If a transaction aborts or there is a crash, it is desirable to ensure that there are no "dangling" references, i.e., a row with no file or a file with no row. In other words, the linkage between rows and files preferably is kept consistent. Value level consistency comes into play during updates to a row with a filestream column. Updates to the file need to be consistent with updates to the row. Values can be updated using in-place updates—the file backing the filestream column is updated in-place, e.g., 15 bytes are modified at offset 10. This would necessitate logging of pre/post images so that during recovery there is sufficient information to do redo/undo processing. Values can also be updated by replacing updates in which the file backing the filestream column is deleted and a new file is created with the updated data.

Figure 4:
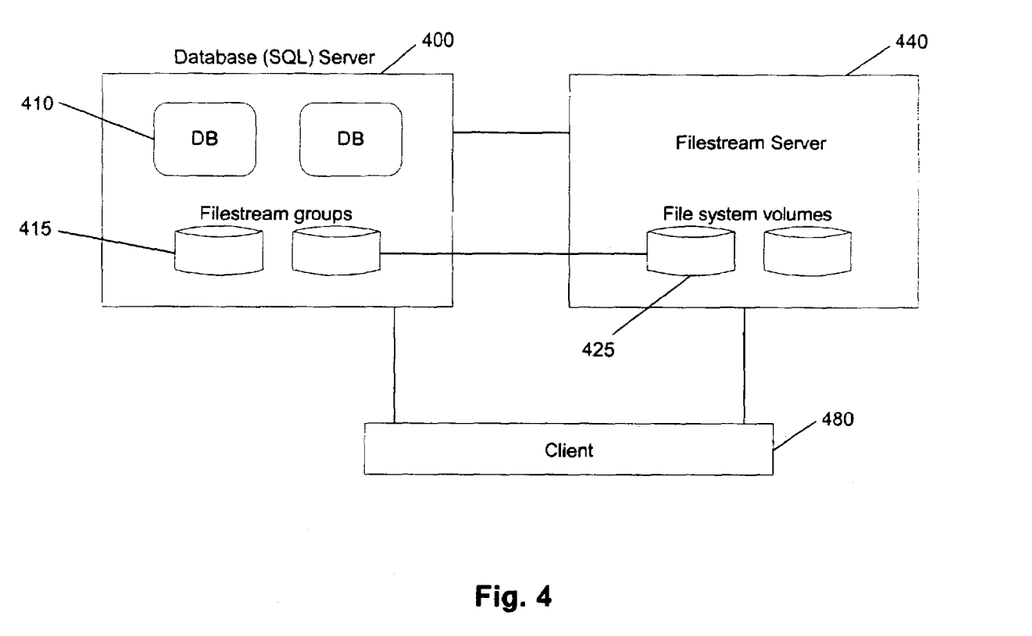
FIG. 4 is an exemplary system diagram in accordance with the present invention.

According to an embodiment as shown in FIG. 4, three machines are implemented to play three different roles: (1) a client machine 480 from which the queries are initiated against the database(s) 410 to locate and manipulate the relevant information; (2) a database server 400 which hosts the database(s) 410; and (3) a filestream server 440 which manages the file system volumes 425 on which the filestream values associated with a given database 410 are stored and supports out-of-band updates to the database(s) 410. Each database can have one or more filestream groups 415, and each filestream group 415 can include one or more volumes 425. The volumes reside on the filestream server 440. In an exemplary database installation, there are thousands of client machines, tens of filestream servers, and one database server. Specialized configurations arise when the volumes on which filestream data is stored are co-located with the database.

Preferably, a registration mechanism is provided by which the identifiers (e.g., GUIDs) associated with all file system volumes 425 containing filestream values are registered with a locator service which will enable a client machine 480 to establish network connectivity with a filestream server 440. Moreover, the database server(s) 400 register the identifiers (e.g., GUIDs) of the database(s) 410 hosted by them. One possible implementation of such a locator service would be the domain name system (DNS) service which can map the volume GUIDs and database GUIDs to IP addresses.

The filestream server 440 and the client redirector are preferably built on a protocol for maintaining the coherency of SQL metadata and filestream value data between the SQL database server 400 and the filestream server 440. On the client side, the protocol extensions enable the client machine 480 to handle redirected requests from the database server 400 to the filestream server 440. In order to facilitate the maximal offloading of activity from the database server 400 to the various filestream servers 440, the protocol extensions include the ability to exchange notifications about changes in the metadata of the various tables, e.g., addition of a constraint, trigger or column and deletion of a trigger, constraint or column. The FAM (e.g., FAM 240 in FIG. 2) implemented as part of the SQL stack contains the callouts to initiate the propagation/invalidation of cached metadata on the filestream servers 440 and ensure that they are synchronized with the metadata changes on the database server 400.

There are some cases in which the three machine configuration can be collapsed into fewer machines. In one scenario, for example, the file system volume containing the filestream data is hosted on the same machine as the database (e.g., SQL) server. In another exemplary scenario, the table is being accessed from the machine hosting the SQL server. From the underlying architecture perspective, this translates into either accessing a resource across the network or a local resource.

To enforce better consistency between the filestream references stored in the database and the filestream servers, a mechanism is provided on which the guarantees can be built in an incremental manner. The foundation for this is built on a user mode SQL agent that runs on the filestream servers and communicates with an agent running on the SQL server. By restricting the communication required to enforce consistency to this small group of machines, a better scale out architecture is provided.

This SQL agent is responsible for enforcing the link level consistency between the filestream servers 440 and the database server 400. For example, it will prevent the deletion of a StreamGUID that is being currently referenced by a row in a database. Preferably, the prevention of out of band deletion of stream values referenced in the database(s) 410 will be enforced. If the column were marked "read only" in the database 410, the filestream server 440 will deny write access to anyone using the generated pathname to gain write access to the value. If the column were marked "read/write", the filestream server 440 can obtain the raw access control list from the database server 400 and evaluate it before granting access to the value. This provides another opportunity for off-loading more processing from the database server 400 to the filestream server 440. The operations on the table such as dropping of a column and the corresponding deletion of all values referenced by that table can be offloaded to the filestream server 440.

Figure 5:
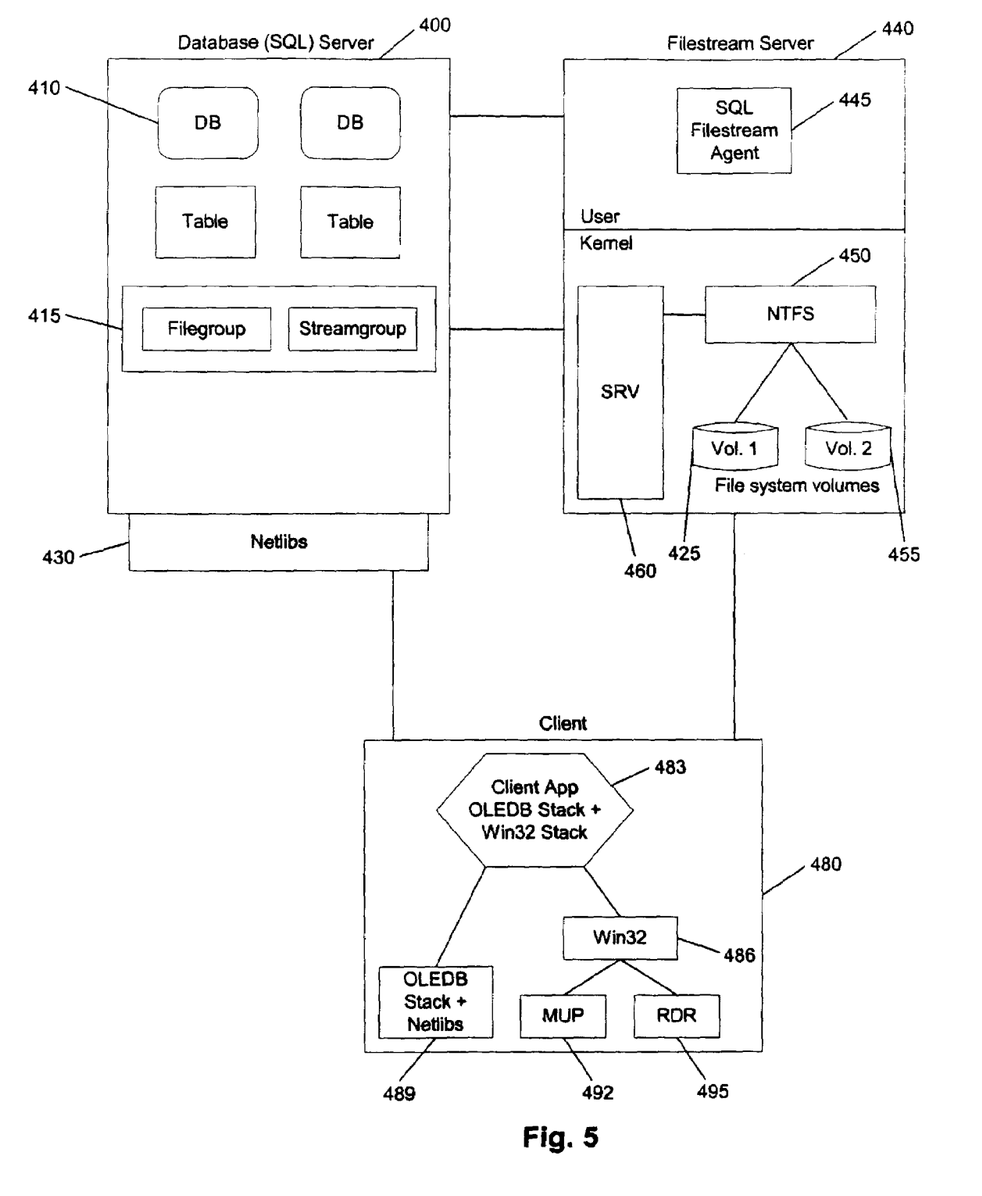
FIG. 5 is a more detailed system diagram of FIG. 4.

FIG. 5 is a more detailed diagram of an exemplary system in accordance with the present invention. The interactions of the components are described with respect to FIG. 5. The client 480 (in particular, the client application 483) issues a query regarding a column in a TABLE stored on the database (SQL) server 400. The OLEDB stack 489 receives the query and provides it to the database server 400, in particular Netlibs 430.

The client application 483 receives a result set back via the OLEDB stack 489. The client 480 then obtains pathnames for rows when it desires access to the content. This is done by calling the GetPathName( ) function provided by the OLEDB stack 489. The client application 483 performs a regular Win32 open (via element 486) against this pathname or launches SHELL extension with this pathname. Win32 open goes to MUP 492 in the kernel, which contacts the available redirectors (RDR) 495. The appropriate redirector 495 claims this path and process the open via a lanman server (SRV) 460.

The filestream server 440 receives the open with a pathname, preferably in the canonical form described above. The SRV 460 reflects to a user-mode SQL agent 445. The agent 445 contacts the database 410 to obtain appropriate row-level locks, ACLs (access control lists), etc. This information is provided to the SRV 460. The SRV 460 now has enough information to complete a direct ID based open against the NT file system (NTFS) 450 volume 455 containing the stream. The SRV 460 caches the information thus obtained to save future user-mode roundtrips and/or trips to the database. The SRV 460 completes the open to the RDR 495 which completes the open to the client application 483. The client application 483 now has a Win32 handle and can issue reads/writes against it. It is noted that the communication between the user-mode SQL filestream agent 445 and the database(s) 410 can be bidirectional.

The present invention can be applied to a wide variety of technologies, database mapping, resources and localization, web services, business process modeling, enterprise software customization, and tools, for example.

As mentioned above, while exemplary embodiments of the present invention have been described in connection with various computing devices and network architectures, the underlying concepts may be applied to any computing device or system. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. For example, one skilled in the art will recognize that the methods as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method of handling large unstructured objects, comprising:
   providing a database with an attribute that alerts the database to store an attributed large unstructured object as a complete contiguous file;
   creating a filestream group associated with the database and based on the attribute, the filestream group comprising at least one volume having filestream data associated with the database;
   associating the filestream group with a table in the database, the table comprising a plurality of columns;
   identifying a filestream column, from the plurality of columns in the table, that points to the filestream data; and
   populating a plurality of cells in the filestream column with values associated with the large unstructured objects.

2. The method of claim 1, further comprising modifying the filestream group by one of adding and deleting a Volume from the filestream group.

3. The method of claim 1, further comprising creating the database prior to creating the filestream group associated with the database.

4. The method of claim 1, wherein populating the cells comprises at least one of inserting a null value, inserting an empty value, inserting with data inline, and inserting with data copied from a pre-existing file.

5. The method of claim 1, further comprising storing the large unstructured objects as filestream data as a file in a file system external to the database.

6. The method of claim 5, wherein the file is a single contiguous file.

7. The method of claim 5, further comprising assigning a unique identifier to the file.

8. The method of claim 1, further comprising generating a pathname for each cell in the filestream column.

9. A computer-readable storage medium having stored thereon computer-executable instructions for handling large unstructured objects, the instructions comprising:
   providing a database with an attribute that alerts the database to store an attributed large unstructured object as a complete contiguous file;
   creating a filestream group associated with the database and based on the attribute, the filestream group comprising at least one volume having filestream data associated with the database;
   associating the filestream group with a table in the database, the table comprising a plurality of columns;
   identifying a filestream column, from the plurality of columns in the table, that points to the filestream data; and
   populating a plurality of cells in the filestream column with values associated with the large unstructured objects.

10. The computer-readable storage medium of claim 9, having further computer-executable instructions for modifying the filestream group by one of adding and deleting a volume from the filestream group.

11. The computer-readable storage medium of claim 9, having further computer-executable instructions for creating the database prior to creating the filestream group associated with the database.

12. The computer-readable storage medium of claim 9, wherein populating the cells comprises at least one of inserting a null value, inserting an empty value, inserting with data inline, and inserting with data copied from a pre-existing file.

13. The computer-readable storage medium of claim 9, having further computer-executable instructions for storing the large unstructured objects as filestream data as a file in a file system external to the database.

14. The computer-readable storage medium of claim 13, wherein the file is a single contiguous file.

15. The computer-readable storage medium of claim 13, having further computer-executable instructions for assigning a unique identifier to the file.

16. The computer-readable storage medium of claim 13, having further computer-executable instructions for generating a pathname for each cell in the filestream column.

17. A computer-readable storage medium comprising: a filestream attribute used in providing a database the ability to handle large unstructured objects, the filestream attribute alerting the database to store an attributed large unstructured object as a complete contiguous file and identifying filestream data in a column in the database that is stored as a file, the column populated with values associated with filestream data and the large unstructured objects.

18. A computer-readable storage medium comprising: a filestream access component that stores large unstructured objects as filestream data as a file in a File system external to a database having a filestream attribute and provides an interface for manipulating the large unstructured objects in the database, the filestream attribute alerting the database to store an attributed large unstructured object as a complete contiguous file.

19. A database system implemented at least in part by a computing device for handling large unstructured objects, comprising:

a database server comprising at least one database having an attribute that alerts the database to store an attributed large unstructured object as a complete contiguous file and an associated filestream group, the filestream group comprising at least one volume having filestream data associated with the database, the database further having a table comprising a plurality of columns, one of said columns being a filestream column that points to filestream data; and a filestream server which stores the large unstructured objects as the filestream data.

20. The database system of claim 19, wherein the filestream server grants and prevents access to the database.

21. The database system of claim 19, wherein the filestream server queries the database and receives a pathname for a cell in the database in response to the query.

22. The database system of claim 21, wherein the filestream server comprises a filestream agent that queries the database.

23. The database system of claim 19, further comprising a client machine which queries the database server for the filestream data.

* * * * *